United States Patent
Henry

[15] 3,636,981
[45] Jan. 25, 1972

[54] FLOW VALVE

[72] Inventor: Frederick D. Henry, 18413 Florwood Ave., Torrance, Calif. 90504

[22] Filed: May 4, 1970

[21] Appl. No.: 34,328

[52] U.S. Cl. ...................................................137/625.46
[51] Int. Cl. .......................................................F16k 11/06
[58] Field of Search ................137/625.46, 625.47, 625.31, 137/625.32, 625.3

[56] References Cited

UNITED STATES PATENTS

| | | | |
|---|---|---|---|
| 2,988,107 | 6/1961 | Rudelick | 137/625.46 |
| 3,090,396 | 5/1963 | Rudelick | 137/625.47 X |
| 3,098,508 | 7/1963 | Gerdes | 137/625.32 X |
| 3,363,412 | 1/1968 | Fischer et al. | 251/324 X |
| 2,818,881 | 1/1958 | Bonner et al. | 137/625.46 X |
| 2,855,956 | 10/1958 | Huff et al. | 137/625.47 X |
| 3,038,314 | 6/1962 | Hultman | 137/625.46 X |

FOREIGN PATENTS OR APPLICATIONS

| | | | |
|---|---|---|---|
| 69,625 | 3/1952 | Netherlands | 137/625.46 |

Primary Examiner—Samuel Scott
Attorney—Gausewitz & Carr

[57] ABSTRACT

A tubular valve housing is ported to provide for fluid flow to and from the interior of the housing. A helical valve spool having coils of rectangular cross section is rotatably mounted within the housing and has the width of the coils thereof equal to or greater than the ports in the housing whereby various ones of the housing ports are opened or closed by the helical spool coils in various rotational positions of the spool. Temperature compensation and wear compensation are provided by an adjustable tie rod that extends axially through the helical spool to provide a predetermined amount of axial compression which may be adjustable as the spool and housing wear.

18 Claims, 4 Drawing Figures

PATENTED JAN 25 1972

3,636,981

INVENTOR.
FREDERICK D. HENRY

BY
Gausewitz & Carr

ATTORNEYS.

3,636,981

FLOW VALVE

BACKGROUND OF THE INVENTION

1. Field of the Invention

The present invention relates to fluid handling apparatus and more particularly concerns a flow valve having an improved valve spool arrangement.

2. Description of Prior Art

Effective sealing within a valve requires close and intimate contact of valve and seat elements. Improved operation has been achieved almost entirely at the cost of expensive, careful, high tolerance manufacturing to obtain parts of precision fit. Nevertheless, despite care taken in initial manufacture and fitting of the valve and seat, gradual wear of parts during period of operation will seriously degrade the sealing. Furthermore detrimental effects of temperature variations upon the desired close fit may be experienced immediately.

Attempting to solve problems of wear, various spring urged valve spool members have been suggested as for example, in the U.S. Pat. No. 3,212,752, to Kast, which suggests the use of a reed-type flow control assembly having an internal spring adapted to bias the flexible reeds toward the valve seat. In order to perform this function, Kast must employ a complex valve mechanism embodying a large number of carefully controlled parts that are assembled in a costly and complex mechanism. In such an assembly having so many parts, failure or improper operation of one of the large number of elements is of increased probability whereby despite the increased effort in manufacture, the probability of the failure of valve has been increased.

For different purposes other spring arrangements have been employed in flow valves such as those illustrated in U.S. Pat. No. 1,661,886 to Eisenhauer and in U.S. Pat. No. 3,151,628 to Heckert. These patents teach a valve arrangement embodying substantially conventional spool and seat members, but which also employs internally mounted helical coils that are subject to varying axial compression. In these arrangements the coils themselves do not provide any sealing function and do not form either part of the valve seat or valve spool. Rather, the helical coils of these patents are employed as variable flow restrictive orifices by virtue of the axial spacing between successive coils of the helix. These patents suggest no solution to the problem of maintaining high-tolerance dimensional relations between the valve elements despite wear and ambient temperature variation.

Accordingly, it is the object of this invention to provide a flow valve that can be readily manufactured with low tolerances, but which nevertheless, will retain an adjustable sealing force, provide for wear and automatic temperature compensation.

SUMMARY OF THE INVENTION

In carrying out the principles of the present invention in accordance with a preferred embodiment thereof a tubular ported housing has rotatably mounted therein a helical valve spool. The coils of the helix have exterior surface portions, namely those portions that are adapted to be in contact with the interior of the tubular housing, extending linearly parallel to the spool axis. The spool is subjected to axial compression to urge it to expand radially outwardly and enhance sealing action of the exterior surface portions of the helical spool against the interior of the housing. The valve is operated by rotating the spool relative to the housing whereby ports in the housing are selectively covered and uncovered by the exterior surface portions of the helical spool as the latter rotates.

DETAILED DESCRIPTION

Figure 1:
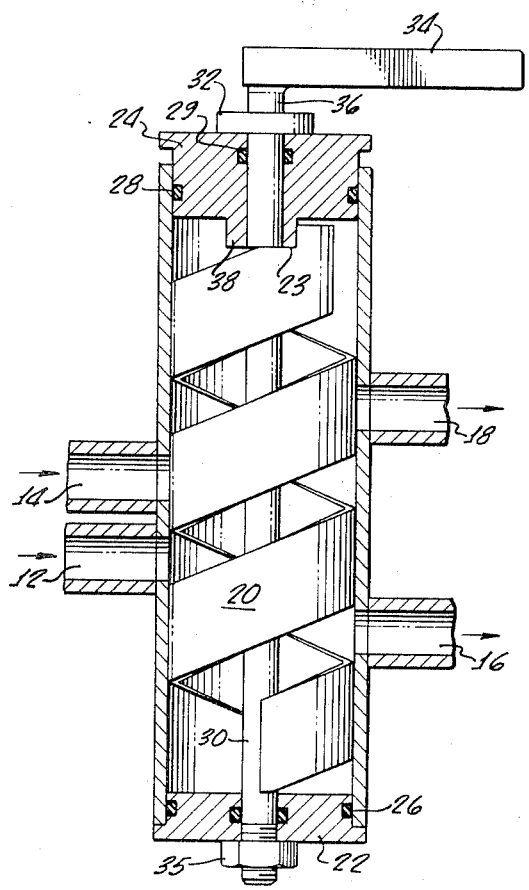
FIG. 1 is a sectional view of a valve illustrating principles of this invention.

As illustrated in FIG. 1, a tubular valve housing 10 has four flow ports 12, 14, 16 and 18, each in free communication with the interior of the valve housing and each adapted to be conventionally connected with other flow lines and flow producing and receiving apparatus (not shown). Rotatably mounted within the cylindrical housing 10 is a helical valve spool 20 having a relatively small number of coils made with a rectangular cross section. Preferably at least one of the end walls of the housing is detached secured by conventional means to facilitate assembly and repair.

Figure 2:
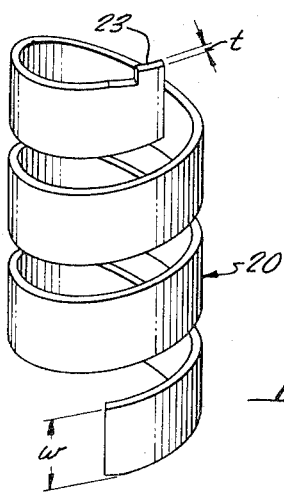
FIG. 2 is a pictorial illustration of the helical spool employed in the invention.

As best seen in FIG. 2, the helical spool coils have a relatively small thickness $t$ and a relatively greater width $w$ that provides for a relatively large area of unobstructed space within the hollow spool and allows each coil to fully cover the entire opening of one of the valve ports. Thus the dimension $w$ is measured along the exterior surface portion of the spool in a direction that is linearly parallel to the axis of the spool. This dimension is at least as great as the diameter of the valve ports.

The helical spool 20 is axially compressed by and between a pair of end plates 22 and 24 which are mounted in sealing relation to the interior of the housing 10 by means of O-rings 26 and 28. End plates 22 and 24 are centrally apertured to receive a tie rod 30 upon which the plates are slidably mounted. End plate 24 is secured to the tie rod 30 by means of a retaining ring 32, that is pinned or otherwise suitably fixed to both the tie rod and end plate so as to prevent the end plate 24 from moving on the rod away from the helical spool. The opposite end of the rod 30, the left-hand end in FIG. 1, is threaded and receives a nut or the like 35 that holds the end plate 22 in place on the rod 30. An angulated operating member, extending through and beyond one end of the housing 10, has a handle 34 and an operating shaft 36 that is fixedly secured to the tie rod, end plate and retaining ring 32 and is sealed to fixed end plate 24 by O-ring 29. The end plates are formed with peripheral, circumferential flanges that abut the ends of housing 10.

The driving end plate 24 has a depending projection or drive finger 38 that abuts a drive shoulder 23 formed in one edge of a terminal one of the helical spool coils. Accordingly, upon rotation of operating handle 34, the end plate 24 is driven by its fixed connection to the tie rod 30 and retaining ring 32 to cause rotation of the drive finger 38. Rotation of the drive finger 38 causes the helical spool to rotate and causes the exterior surface portions of the coils thereof to traverse the interior wall of the cylindrical housing through circular paths of a considerable axial extent. Drive finger 38 extends across the full diameter of end plate 24 whereby it will operate to rotate the spool either clockwise or counterclockwise by abutment with respectively opposite sides of shoulder 23. During the course of spool rotation, different ones of the flow conduits or ports 12, 14, 16, and 18, are selectively covered or uncovered to thus selectively control the fluid flow through the valve. As previously stated, the width $w$ of the coils of the helical spool is at least as great and preferably somewhat larger than the diameter of the ports in the valve housing. With equal spacing between successive coils of the helical spool, the space being equal to the width $w$, each valve port may be completely closed or completely open, depending upon the rotational or angular position of the helical spool. Although it is most convenient to form all coils of the helical valve with a uniform cross section, it will be readily observed that the specified coil dimensions and shape are required only for those coils (and possibly only for portions of these) that traverse a circular path that encompasses one or more of the valve ports. In the position illustrated in FIG. 1, assume for example that ports 12 and 14 are coupled with a source of fluid and ports 16 and 18 are connected with apparatus to which the fluid is to be delivered. In this illustrated spool position ports 14 and 18 are closed whereby no fluid will flow through either of these. Ports 12 and 16 are both open whereby fluid may flow into the valve housing through port 12, through the interior of the housing between the coils of the spool and thence out through port 16. If the handle 34 is rotated, both ports 14 and 18 may be opened and both ports 12 and 16 may be closed.

It will be readily appreciated that an almost unlimited variety of arrangements or patterns of port positions, coil pitch and dimensions may be employed to achieve any selected operation of opening and closing of the various ports either singly, in given preselected combinations, or in selected magnitudes of partial opening and closing. One or more groups of ports may be opened individually in sequence or in some preprogrammed fashion, or alternatively all ports may be opened simultaneously. It will be seen that reversal of the direction of rotation of the handle and spool is not necessary since continued rotation in the same direction will eventually open and close each of the ports in the cylindrical body of the valve housing. In fact, given continued rotation of the spool operator 34, 36, a regular and cyclically repetitive operation of all of the valve ports will be achieved. Still further variations in the operation of the valve may be made by varying the pitch angle of the helical spool. Decrease of the helix pitch will decease the amount of valve opening and closing per unit of angular rotation whereas increased spool pitch will increase the amount of valve opening and closing per unit of angular rotation of the spool.

In the manufacture of FIGS. 1 and 2, the helix is assembled with end plate 24 on the tie rod inserted into the housing and the end plate 22 then is emplaced. Nut 35 is tightened to provide a predetermined amount of prestress in the spool. The axial extent of the body of end plate 24 is sufficient to allow required adjustment of the tie rod.

A significant advantage of the helical arrangement of this valve spool is the fact that the device may be manufactured with relatively low dimensional tolerance. Even though the sealing action of the valve is achieved by the close and intimate contact of the exterior surface portions of the valve spool with the interior cylindrical surface of the housing, the radial dimensions of spool and housing need not be controlled with great precision. This is so because of the radial expansion of the valve spool that results from axial compression. Accordingly, the helix is made to have a diameter in unstressed condition somewhat smaller than the internal diameter of the housing 10. When the nut 34 is tightened upon the tie rod 30 to compress the spool, the latter expands radially and such radial expansion will compensate for varying tolerances in radial dimensions of the ports. Furthermore, should the parts wear after a period of use so that the internal diameter of the housing 10 increases or the exterior surfaces of the helical spool is worn, it is necessary only to tighten the nut 34 to increase axial compression upon the spool whereby the diameter of the latter may be increased to account for any wear that may have occurred.

The described arrangement also may be employed to afford inherent and automatic temperature compensation where materials having different temperature coefficients of expansion are used for spool and housing respectively. When a material such as brass, for example is used for the spool and steel, for example, is used for the housing, brass having a lower temperature coefficient than steel, the spool will expand less, radially, than the housing upon an increase in temperature. However, the axial prestress applied to the spool by the tie rod will continuously urge the spool toward radial expansion, thus automatically compensating for any temperature induced radial difference in dimensions.

It is noted that friction of the interior of the housing exerted upon the exterior surface of the spool, together with the helical configuration of the spool, cause the apparatus to exhibit operating characteristics which are different in one direction of rotation than in the other. For example, viewing the apparatus in FIG. 1 from the right, looking at the device axially from the direction of handle 34, 36, it will be seen that rotation of the valve spool in a counterclockwise direction will exert a force on the helical spool that tends to wind the helix tighter, that is, tends to decrease the radial dimension of the spool. Accordingly, operation in this direction experiences considerably less frictional resistance. Consider on the other hand, rotation of the spool in the clockwise direction. Such rotation tends to cause the spool to unwind thereby increasing its radial dimension and increasing the frictional resistance to rotation. Accordingly, for any continued rotational operation of the arrangement of FIG. 1, rotation in the direction indicated as being counterclockwise in the illustrated example is preferred. It will be appreciated that improved sealing will be achieved by first moving the spool in the clockwise or helix tightening direction to position the spool coils in sealing relation to the ports that are to be closed and then imparting to the spool a slight reverse rotation that will tend to cause the spool to expand and thereby improve its sealing engagement with the valve housing. Of course, the above-described effect will vary in magnitude in accordance with the coefficient of friction of the materials employed.

Sealing of the valve ports may be enhanced by further increase in axial compression of the spool to thereby more tightly force the spool against the interior surface of the housing. The spool may actually be locked against rotation by application of sufficient axial force thereto.

Figure 3:
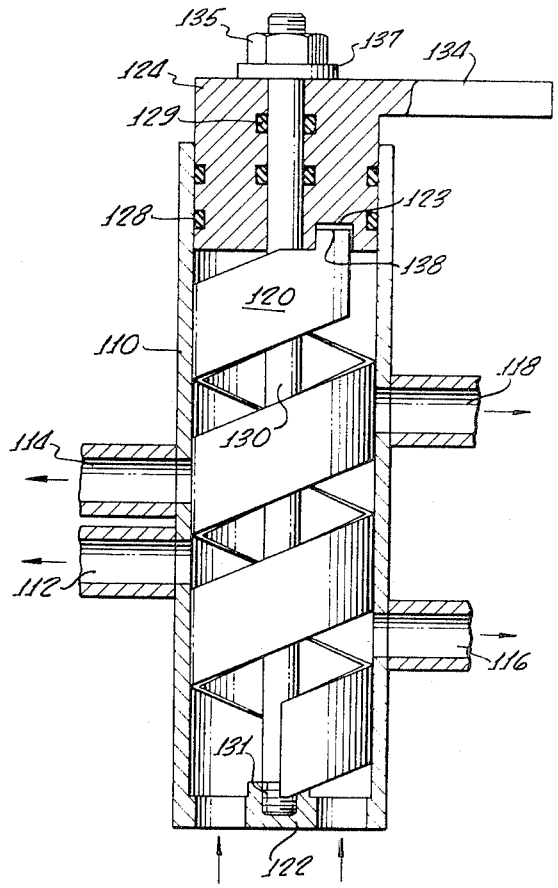
FIG. 3 is a sectional view of a modified form of flow valve.

The arrangement illustrated in FIG. 1 requires sealing at both ends of the tubular housing and embodies end plates separate from the housing at either end of the tie rod. In order to simplify sealing of the arrangement of valve housing and spool assembly and to facilitate and simplify manufacture and assembly, the arrangement of FIGS. 3 and 4 may be employed. In the preferred embodiment of FIG. 3, parts that are functionally equivalent to parts previously described in connection with FIG. 1 are designated by a similar reference, numerals each with the prefix 1 added thereto. Thus, there is shown in FIG. 3 a cylindrical valve housing 110 having a number of outlet ports 112, 114, 116 and 118 formed in the body thereof and adapted to receive standard fittings or other connecting devices or couplings for fluid flow conduits. A sealed end plate 122 is integrally formed as part of the housing. The end plate in this arrangement is provided with a plurality of inlet port 111a, b, c and d. The size, location and number of inlet ports 111a through d is entirely a matter of choice or design and one port of adequate size may well be sufficient. Further, one or more of these ports may be outlet ports. Nevertheless, where a number of outlet ports are provided in the cylindrical sides of the valve body, it is preferable to provide an inlet area substantially equal to the maximum area of outlet porting that will be simultaneously open at any given time A helical valve spool 120 having coils of rectangular cross section, substantially identical to the spool 20 described in connection with FIGS. 1 and 2, is rotatably mounted within the valve housing 110 and axially compressed between the housing end plate 122 and a solid cylindrical compression and drive member 124. Drive member 124 is centrally apertured to receive a tie rod 130 that is fixed at one end thereof to a boss 131 fixedly mounted on the interior of housing end plate 122. The other end of the tie rod 130 is threaded and carries an adjustment nut 135 with a washer 137 interposed between the nut and drive member 124. One or more pairs of external and internal sealing O-rings 128 and 129 are mounted in the exterior and interior surfaces of drive member 124 to provide sealing of the interior of the valve housing. In this arrangement, with a fixed or integral valve body end member 122, sealing of the housing is required only at one end thereof. Drive member 124 is illustrated as incorporating a laterally extending handle 134 which is employed to achieve the desired valve operating rotation of valve spool 120. A slightly modified driving arrangement is employed in this embodiment. Drive finger 138 is integral with the helical spool and projects into a drive recess 123 formed in the body of drive member 124.

Figure 4:
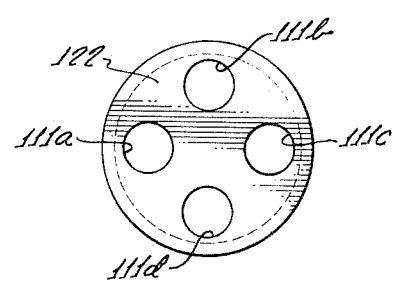
FIG. 4 is an end view of the valve of FIG. 3.

The apparatus of FIGS. 3 and 4 operates in the same manner as the apparatus previously described in connection with FIGS. 1 and 2, and, as previously described, the amount of prestress compression or the amount of axial prestress may be selected together with the materials of helix 120 and housing 110 to provide for automatic temperature compensation. The adjusting nut 135, of course, may be adjusted from time to time as desired in order to compensate for wear.

In this arrangement, as in the previously described arrangement, the number and location of the outlet ports in the valve housing 110 may be varied to achieve sequential operation of the ports or sequential opening and/or sequential closing or the opening and closing of any number of ports in any selected pattern or sequence. Although a manual driving member or operating member 134 is illustrated, it will be readily appreciated that rotation of the spool driving member 124 may be achieved in any one of a number of well-known ways other than by simple straightforward manual operation.

As previously described, a continuous rotation may be employed if cyclic opening and closing of the ports 112 through 118 is required. Other methods of conventional automatic operation are also contemplated including the standard electromagnetic solenoid valve operation commonly employed for rotary valves.

There has been described a unique flow valve useful as a multipositioning valve, a gate valve, a manifold valve, or a shutoff valve that can be manufactured simply and inexpensively with low tolerances and yet providing a close tolerance port sealing which is adjustable, wear compensation, and further, may be preloaded for temperature compensation.

The foregoing detailed description is to be clearly understood as given by way of illustration and example only, the spirit and scope of this invention being limited solely by the appended claims.

I claim:
1. A flow valve comprising
a tubular housing having flow ports therein,
a hollow helical spool rotatably mounted within the housing and having exterior surface portions extending linearly parallel to the axis of the spool so as to selectively cover and uncover at least some of said ports as the spool rotates, and
an operating member connected to rotate the spool relative to the housing.
2. The valve of claim 1 including
means for exerting axial compressive force upon the helical spool.
3. A valve comprising
a ported housing,
a hollow helical valve spool rotatably mounted in the housing, and having an exterior helical surface that selectively covers and uncovers at least one of the ports of said housing as the spool rotates, and
means for rotating the spool.
4. The valve of claim 3 including
means for adjustably compressing the valve spool.
5. The valve of claim 3 wherein said spool comprises a helix having exterior surface portions extending linearly parallel to the axis of the housing.
6. The valve of claim 3 wherein said spool comprises a helical coil having a substantially rectangular cross section.
7. A flow valve comprising
a tubular housing having flow ports therein,
a helical spool rotatably mounted within the housing and having exterior surface portions extending linearly parallel to the axis of the spool,
an operating member connected to rotate the spool relative to the housing, and
means for adjustably compressing the valve spool, said means for compressing comprising
a tension member extending through the spool and secured to opposite ends thereof.
8. A valve comprising
a ported housing,
a valve spool rotatably mounted in the housing,
said spool including a hollow helical coil portion having an exterior surface that at least partially blocks and unblocks one of the ports in said housing as the spool is rotated whereby flow of fluid between said one port and the interior of said hollow helical spool portion is relatively restricted and relatively unrestricted by said surface as it rotates, and
means for rotating said spool.
9. A flow valve comprising
a housing having a plurality of ports and a sidewall having an arcuate inner surface, at least one of said ports being formed in said surface,
a valve spool rotatably mounted within the housing and including at least one helical coil having an exterior surface thereof engaging said inner surface and extending for a distance in the direction of its axis of rotation, said distance being not less than the corresponding dimension of said one port, whereby said helical coil will cover and uncover said one port as said valve spool is rotated, and
means for rotating the spool about its axis.
10. The valve of claim 9 including means for adjusting the force of engagement of said coil exterior surface with said housing inner surface, said means comprising means for adjustably compressing said coil along its axis of rotation.
11. A flow valve comprising
a housing having a plurality of ports and a cylindrical sidewall, at least one of said ports being formed in said sidewall,
a helical valve spool rotatably mounted within the housing and including
a plurality of coils, at least some of said coils having an exterior surface thereof extending for a distance along the elements of an imaginary cylinder that is coaxial with the helical spool,
said distance being not less than the dimension of corresponding ones of each of said ports in a direction parallel to the axis of the housing, and
means for rotating the spool about its axis.
12. The valve of claim 11 wherein said housing has a fixed end wall and at least some of said valve ports are formed in said end wall.
13. The flow valve of claim 11 including
means for axially compressing the valve spool.
14. The valve of claim 13 wherein the coefficient of expansion of the valve spool is less than the coefficient of expansion of said housing, whereby radial expansion of the spool with temperature is less than that of the housing and is compensated by radial expansion due to axial compression of the spool.
15. The valve of claim 11 including
a cylindrical spool compressing and driving member mounted in rotatable driving engagement with said spool,
a tie rod extending axially through the housing and through the spool and including means for engaging opposite ends of the spool.
16. The valve of claim 15 wherein
said driving member is rotatably and axially slidably mounted within the housing and includes an axial aperture receiving one end of the tie rod, and including
a driving element in abutment with a cooperating driving element on the spool, and
means for adjustably retaining the driving member in axial position along the tie rod.
17. The valve of claim 15 wherein said driving member is fixedly secured to one end of the tie rod and has a driving element in engagement with a cooperating driving element or the spool,
said spool engaging means of the tie rod including
means for adjusting the effective length thereof to thereby adjust axial compression of the spool.
18. The valve of claim 15 wherein the spool includes coils having a substantially rectangular cross section.

* * * * *

PO-1C50 (5/69)

UNITED STATES PATENT OFFICE
CERTIFICATE OF CORRECTION

Patent No. 3,636,981          Dated January 25, 1972.

Inventor(s) Frederick D. Henry

It is certified that error appears in the above-identified patent and that said Letters Patent are hereby corrected as shown below:

Column 2, line 11, change "detached" to --detachably--. Column 3, line 26, after "manufacture" insert the words --of valve--. Column 5, line 24, change "compensation" to --compensating--.

Signed and sealed this 3rd day of October 1972.

(SEAL)
Attest:

EDWARD M. FLETCHER, JR.                ROBERT GOTTSCHALK
Attesting Officer                       Commissioner of Patents